United States Patent
Groll et al.

(10) Patent No.: US 11,201,488 B2
(45) Date of Patent: Dec. 14, 2021

(54) METHOD AND DEVICE FOR OPERATING AN ENERGY STORE

(71) Applicant: Bayerische Motoren Werke Aktiengesellschaft, Munich (DE)

(72) Inventors: Max von Groll, Mountain View, CA (US); Oliver Bohlen, Munich (DE); Elvis Delbono, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 744 days.

(21) Appl. No.: 13/923,435

(22) Filed: Jun. 21, 2013

(65) Prior Publication Data

US 2014/0002030 A1    Jan. 2, 2014

Related U.S. Application Data

(63) Continuation of application No. PCT/EP2011/073209, filed on Dec. 19, 2011.

(30) Foreign Application Priority Data

Dec. 22, 2010 (DE) ............... 10 2010 063 971.0

(51) Int. Cl.
*H02J 7/00* (2006.01)
*B60L 58/22* (2019.01)

(52) U.S. Cl.
CPC ............ *H02J 7/007* (2013.01); *B60L 58/22* (2019.02); *H02J 7/0014* (2013.01); *H02J 7/0016* (2013.01); *Y02T 10/70* (2013.01)

(58) Field of Classification Search
CPC ...... H02J 7/0014; H02J 7/0018; H02J 7/0019; H02J 7/0016; H02J 7/0021; H02J 7/0022;
(Continued)

(56) References Cited

U.S. PATENT DOCUMENTS 6,960,899 B2    11/2005    Kobayashi et al.
6,985,799 B2    1/2006    Zalesski et al.
(Continued)

FOREIGN PATENT DOCUMENTS

DE    10 2004 006 022 A1    9/2004
DE    10 2006 005 334 A1    8/2007
(Continued)

OTHER PUBLICATIONS

International Search Report dated Nov. 23, 2012 with English translation (Four (4) pages).
(Continued)

*Primary Examiner* — Richard Isla
*Assistant Examiner* — Michael N Dibenedetto
(74) *Attorney, Agent, or Firm* — Crowell & Moring LLP

(57) ABSTRACT

An energy store has at least one energy storage module with a plurality of energy storage cells. The energy storage cells are each electrically coupled to a monitoring unit. Each monitoring unit is designed to discharge the respective energy storage cell by use of a specified symmetry current in an active operating state. The method operates the energy store by performing the acts of: detecting an open-circuit voltage of each energy store cell and determining a discharge duration for each energy storage cell as a function of the open-circuit voltage of the energy storage cell and a specified target discharge voltage value; and controlling each monitoring unit in order to discharge the respective energy storage cell by use of the specified symmetry current for the discharge duration associated with the respective energy storage cell.

11 Claims, 8 Drawing Sheets

(58) Field of Classification Search
CPC .......... H02J 7/0026; H02J 7/007; H02J 7/042; H02J 7/00712; H02J 7/007188; H02J 7/0027; H02J 7/0063; B60L 11/1866; B60L 3/00; B60L 3/0046; Y02T 10/7005; Y02T 10/7061; Y02T 10/70; H01M 10/44; H01M 10/441; H01M 10/443; H01M 10/446; H01M 10/448
USPC .................................................. 320/116–122
See application file for complete search history.

(56) References Cited

U.S. PATENT DOCUMENTS

| | | | |
|---|---|---|---|
| 7,439,710 | B2 | 10/2008 | Ishishita |
| 7,852,042 | B2 | 12/2010 | Froeschi et al. |
| 2002/0011820 | A1* | 1/2002 | Suzuki ................. H02J 7/0014 320/132 |
| 2005/0119319 | A1* | 6/2005 | Meese ................. A61K 31/4164 514/366 |
| 2006/0119319 | A1* | 6/2006 | Sakurai ................. H02J 7/0016 320/116 |
| 2010/0033135 | A1* | 2/2010 | Nishida ................. B60L 3/0046 320/136 |
| 2010/0109608 | A1* | 5/2010 | Buono ................. H02J 7/0019 320/121 |
| 2011/0074355 | A1* | 3/2011 | Dao ................. H01M 10/441 320/118 |

FOREIGN PATENT DOCUMENTS

| | | |
|---|---|---|
| DE | 11 2004 001 276 T5 | 8/2007 |
| EP | 2 254 219 A1 | 11/2010 |
| JP | 2007-143373 A | 6/2007 |
| JP | 2007-244142 A | 9/2007 |
| JP | 2254219 A1 * | 11/2010 ............ B60L 3/0046 |

OTHER PUBLICATIONS

German Search Report dated Jul. 15, 2011 with English translation (Nine (9) pages).
International Preliminary Report on Patentability (PCT/IB/373), including Written Opinion (PCT/ISA/237) dated Jun. 25, 2013 (Eight (8) pages).

* cited by examiner

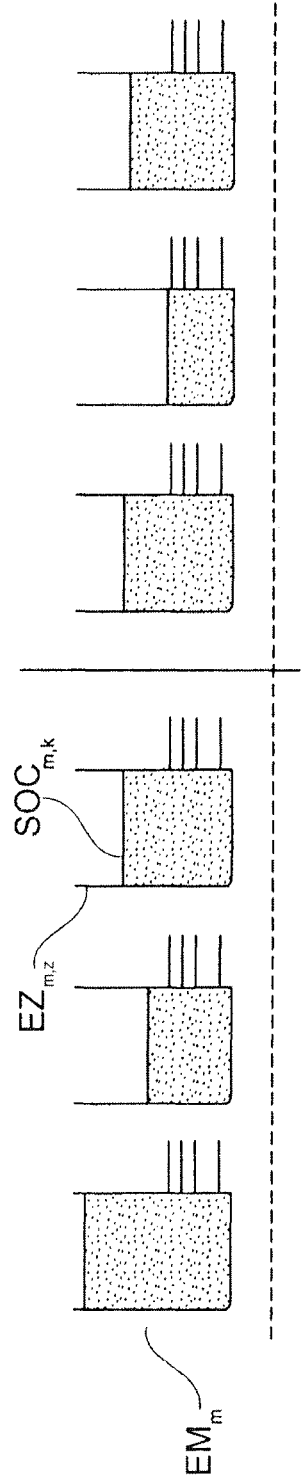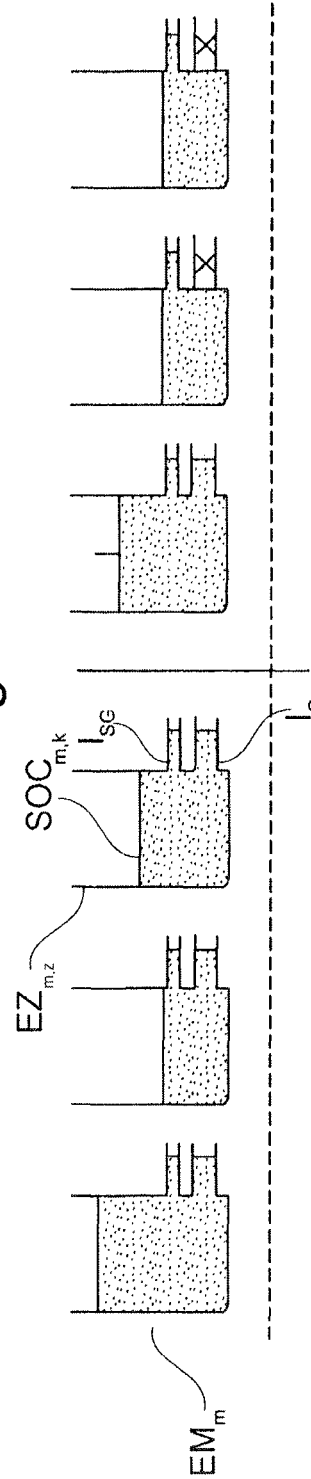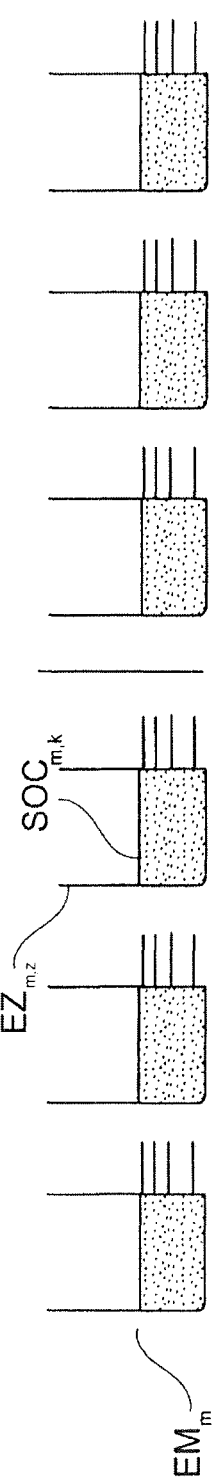

METHOD AND DEVICE FOR OPERATING AN ENERGY STORE

CROSS REFERENCE TO RELATED APPLICATIONS

This application is a continuation of PCT International Application No. PCT/EP2011/073209, filed Dec. 19, 2011, which claims priority under 35 U.S.C. § 119 from German Patent Application No. DE 10 2010063971.0, filed Dec. 22, 2010, the entire disclosures of which are herein expressly incorporated by reference.

BACKGROUND AND SUMMARY OF THE INVENTION

The invention relates to a method and a device for operating an energy story with at least one energy storage module which has a plurality of energy storage cells.

Due to a low CO2 emission, the interest in battery-powered vehicles, in particular in vehicles with a hybrid drive, has greatly increased. Vehicles with hybrid drives have, in comparison to conventional vehicles, an additional energy store, in which recovered energy can be stored. The performance of the energy store plays an essential role in the function of battery-powered vehicles and hybrid vehicles. Modern high-voltage batteries for hybrid and electric vehicles have a plurality of energy storage cells connected in series. The performance of these batteries with a plurality of energy storage cells connected in series results from the sum of the performance of the individual energy storage cells. Due to manufacturing tolerances of the energy storage cells linked to production and/or temperature differences in the energy store, energy storage cells can, over time, have different states of charge. As a result, a usable energy amount decreases over time and reduces the performance of the energy store system.

The underlying object of the invention is to provide a method and a device for operating an energy store which, respectively, contribute to reliably operating the energy store.

This and other objects are achieved according to the invention by a method and a corresponding device for operating an energy store having at least one energy storage module which has a plurality of energy storage cells. The energy storage cells are each electrically coupled to a monitoring unit. Each monitoring unit is designed to discharge the energy storage cell by way of a specified symmetry current in an active operating state. The method includes the following steps: an open-circuit voltage of each energy storage cell is detected and a discharge duration is determined for each energy storage cell as a function of the open-circuit voltage and a specified target discharge value; and, each monitoring unit is controlled in order to discharge the respective energy storage cell by way of the specified symmetry current for the discharge duration associated with the respective energy storage cell.

This enables the determination of a suitable control variable at low computational cost, by which variable a cell state-of-charge symmetry can be induced. Advantageously, state of charge deviations can be thereby minimized and a maximum performance of the energy store can be achieved.

Due to manufacturing tolerances of the energy storage cells linked to production and/or temperature differences in the energy store and/or due to a distribution of a current consumption of the monitoring units, the energy storage cells can, over time, have different states of charge. Depending on the structure and materials used, the energy storage cells have, for example, a specified open-circuit voltage characteristic with a hysteresis. The open-circuit voltage characteristic describes a behavior of an open-circuit voltage of an energy storage cell as a function of the state of charge of the energy storage cell. If the open-circuit voltage characteristic has a hysteresis, then, for example, the open-circuit voltage of the energy storage cell, which sets in after a longer period of time during an idle phase of a motor vehicle (for example after longer charging phases), is greater than after longer discharge phases. For example, lithium-based energy stores, which are used in modern hybrid- and electric vehicles, can have a hysteresis of this type. The open-circuit voltage can be detected during a longer idle phase of the motor vehicle, for example after a longer discharge phase or charging phase of the energy store. In this case, the open-circuit voltage detected can be associated to a discharge curve or a charge curve of the open-circuit voltage characteristic, and in this manner, for example, a state of charge of the energy storage cell is determined.

Advantageously, monitoring of a cell voltage of each energy storage cell during a symmetrization phase is not necessary. The state of charge cell symmetry can be induced independently from a hysteresis of the open-circuit voltage characteristic of the energy storage cell. The state of charge cell symmetry can be induced independently from electro-chemically caused hysteresis characteristics of the energy storage cells. The state of charge cell symmetry can also be induced in the case, at which each energy storage module has a very large difference in the state of charge between the energy storage cells.

The monitoring unit, to which each energy storage cell can be coupled, can be designed to detect for example a temperature and/or a voltage of an energy storage cell.

Furthermore, the energy store can have a central control unit with a memory unit, which control unit is designed for example to detect specified state variables and/or operating variables of the energy storage module and/or for example to control the monitoring units of an energy storage module as specified. A cyclical wake-up of the monitoring unit and/or the central control unit can necessitate a higher power demand. Since each monitoring unit is controlled for discharging the respective energy storage cell by way of a specified symmetry current for the discharge duration associated with the respective energy storage cell, the cyclical wake-up of the monitoring unit and/or the central control unit, for example during a longer idle phase of the electric or hybrid vehicle, is not necessary. Furthermore, by this means a lifespan of the central control unit with the storage unit can be increased, since a cyclical detecting and storing of the respective cell voltage is not necessary. The cyclical detecting and storing of the respective cell voltage can necessitate that memory in the storage unit is written very often. This can disadvantageously effect a lifespan of the memory, which is for example designed as non-volatile random access memory. The discharge of the storage cells can take place during any operating state of the energy store or of the electric or hybrid vehicle, for example during a drive of the electric or hybrid vehicle or during a charging phase of the energy store. For example, the symmetrization phase can be initiated during a transport phase and take place without voltage supply of the central control unit. The discharge of the energy storage cells can take place temporally independent of the detection of the open-circuit voltage.

If the energy store has a plurality of energy storage cells, then it is advantageous if the energy storage cells each have very similar construction with respect to dimensions and materials, and thus have approximately the same electrical characteristics. For example, the symmetry current can be selected identically for all energy storage cells.

According to an advantageous embodiment, the respective monitoring unit draws a specified operating current and the discharge duration of the energy storage cell is determined as a function of the operating current. The operating current can be identical for all monitoring units. This enables consideration of a passive discharge of the energy storage cell during the symmetrization phase. The monitoring unit can have an off operating state, which can be characterized in that no energy is supplied to the monitoring unit and the monitoring unit executes no functions. Furthermore, the monitoring unit can have a passive operating state. The passive operating state can be characterized in that the operating current is supplied to the monitoring unit and the monitoring unit is operationally ready to execute a specified function, in particular to discharge an energy storage cell. Further, the monitoring unit can have an active operating state, which can be characterized in that the operating current is supplied to the monitoring unit and the monitoring unit executes the specified function, in particular the discharge of the respective energy storage cell by way of the symmetry current. The monitoring unit preferably draws the operating current from the energy storage cell.

According to an additional advantageous embodiment, a maximum cell voltage for the energy storage module is respectively determined as a function of the open-circuit voltages of each energy storage cell of the energy storage module. Furthermore, the discharge duration is determined as a function of the maximum cell voltage. The monitoring unit of the energy storage cell can be designed and/or controlled in such a way that the monitoring unit has a passive operating state in the symmetrization phase, during which one or more of the energy storage cells of the energy storage module, which includes the energy storage cell, are active discharged by means of the specified symmetry current. This means that the energy storage cell, which is not actively discharged, is nonetheless discharged by means of the operating current. A duration, during which the monitoring unit of the energy storage cell has an active or passive operating state, and thus actively and/or passively discharges the energy storage cell, can therefore be a function of the maximum cell voltage of the energy storage module to which said monitoring unit is associated.

According to an additional advantageous embodiment, the discharge duration is determined as a function of the specified symmetry current.

According to an additional advantageous embodiment, the discharge duration is determined as a function of a specified increase of an open-circuit voltage characteristic of an energy storage cell.

According to an additional advantageous embodiment, the increase is determined as a function of a state of charge detected for the energy storage cell.

According to an additional advantageous embodiment, the target discharge voltage value is determined as a function of open-circuit voltages detected for a specified first number of energy storage cells. The first number can, for example, be identical to the total number of energy storage cells that the energy store has.

According to an additional advantageous embodiment, a minimum open-circuit voltage is respectively determined for each energy storage module as a function of the open-circuit voltages of the respective energy storage cells of said energy storage module. Furthermore, a cell discharge voltage for the respective energy storage module is determined as a function of the minimum open-circuit voltage of the respective energy storage module. Furthermore, the target discharge voltage value is determined as a function of the cell discharge voltages determined for a second number of energy storage modules. For example, the specified second number of energy storage modules can be identical to a total number of energy storage modules that the energy store has.

According to an additional advantageous embodiment, the cell discharge voltage for each energy storage module is determined as a function of the maximum cell voltage of the energy store.

According to an additional advantageous embodiment, the cell discharge voltage for each energy storage module is determined as a function of a ratio of the symmetry current to the operating current.

Other objects, advantages and novel features of the present invention will become apparent from the following detailed description of one or more preferred embodiments when considered in conjunction with the accompanying drawings.

BRIEF DESCRIPTION OF THE DRAWINGS

FIGS. 3a-3c provide a model depiction for a symmetrization of the energy storage cells;

DETAILED DESCRIPTION OF THE DRAWINGS

Figure 1:
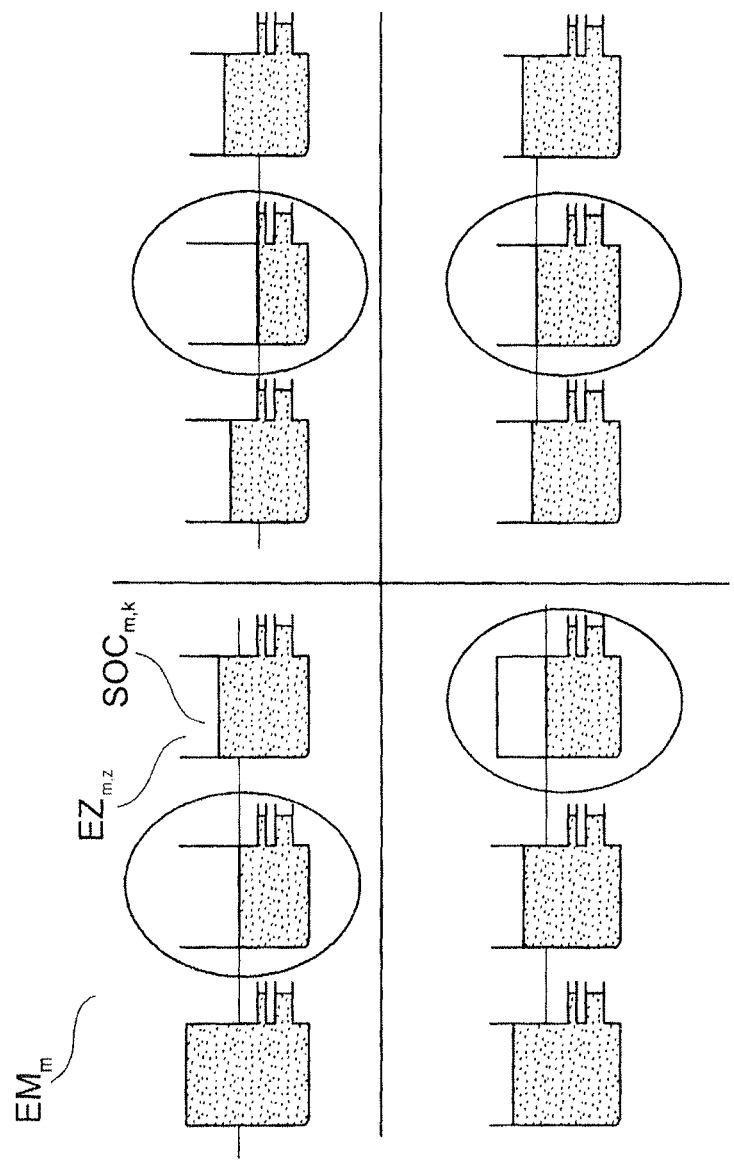
FIG. 1 is a first model depiction of an energy store.

FIG. 1 shows a model depiction of an energy store. The energy store has a plurality of energy storage modules $EM_m$, for example four energy storage modules $EM_m$. Each energy storage module $EM_m$ includes a plurality of energy storage cells for example three energy storage cells $EZ_{m,z}$. Each energy storage module $EM_m$ preferably has an identical number of energy storage cells $EZ_{m,z}$, which are designed similarly with respect to materials and construction technology. The energy storage cells $EZ_{m,z}$ have at least, in part, different states of charge (SOC).

Each energy storage cell $EZ_{m,z}$ is respectively coupled to a monitoring unit, which is designed to discharge the respective energy storage cell $EZ_{m,z}$ by way of a specified symmetry current $I_S$. The symmetry current $I_S$ is preferably approximately equal, in particularly identically equal for all monitoring units. The symmetry current $I_S$ is, for example, approximately 60 mA.

The monitoring unit has, for example, a switchable resistor. If, for example, the switchable resistor has a first switch position, the associated energy storage cell $EZ_{m,z}$ can be discharged via said resistor. If the switchable resistor has, for example, a second switch position, the associated energy storage cell $EZ_{m,z}$ cannot be discharged via said resistor.

The monitoring unit can require a specified operating current $I_{SG}$ in an active and in a passive operating state, which current is preferably drawn from the associated energy storage cell $EZ_{m,z}$. The operating current $I_{SG}$ is, for example, approximately 25 mA. The active operating state of the monitoring unit can be characterized in that the monitoring unit draws the specified operating current $I_{SG}$ from the associated energy storage cell $EZ_{m,z}$ and the switchable resistor is in the first switch position, so that the monitoring unit actively discharges the energy storage cell $EZ_{m,z}$ by use of the specified symmetry current $I_S$. The passive operating state of the monitoring unit can be characterized in that the monitoring unit draws the specified operating current $I_{SG}$ from the associated energy storage cell $EZ_{m,z}$, however, the switchable resistor is in the second switch position, so that the energy storage cell $EZ_{m,z}$ is not actively discharged by use of the symmetry current $I_S$.

Figure 2B:
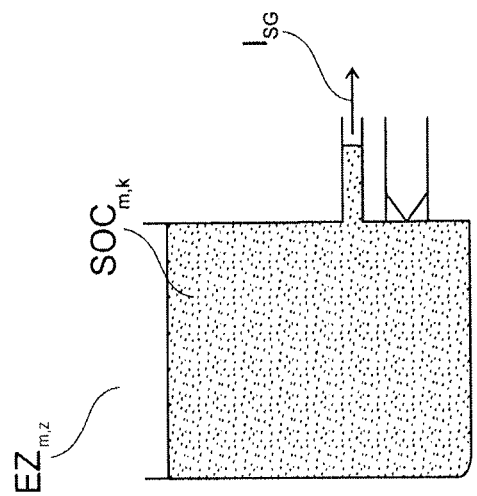
FIGS. 2a and 2b provide a second model depiction of an energy store.
Figure 2A:
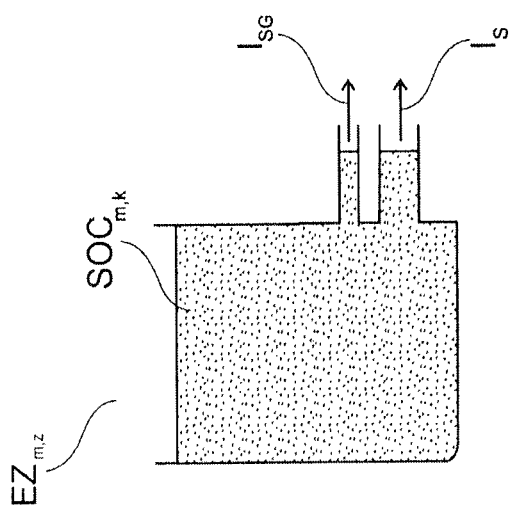

In an active operating state, the monitoring unit discharges the energy storage cell $EZ_{m,z}$ by way of the symmetry current $I_S$ and the operating current $I_{SG}$ (FIG. 2a). While the monitoring unit is in an active operating state, the associated energy storage cell $EZ_{m,z}$ is actively discharged. In a passive operating state, the monitoring unit discharges the energy storage cell $EZ_{m,z}$ by way of the operating current $I_{SG}$ (FIG. 2b). While the monitoring unit is in a passive operating state, the associated energy storage cell $EZ_{m,z}$ is passively discharged. A duration, during which the monitoring unit is in an active and/or in a passive operating state, can be designated as awake time T_wach,m of the monitoring unit.

The respective monitoring units can be designed in such a way that a discharge of at least one of the energy storage cells $EZ_{m,z}$ of the energy storage module $EM_m$ requires that all monitoring units are in the active operating state and/or the passive operating state during a duration of the discharge of at least one energy storage cell $EZ_{m,z}$.

FIG. 3 illustrates a discharge of the energy storage cell $EZ_{m,z}$ during a symmetrization phase. Prior to the symmetrization phase (FIG. 3a), the energy storage cells $EZ_{m,z}$ have at least in part different states of charge as illustrated.

During the symmetrization phase (FIG. 3b), insofar as not all energy storage cells $EZ_{m,z}$ of each energy storage module $EM_m$ have a minimum state of charge, all energy storage cells $EZ_{m,z}$ of the energy storage module $EM_m$ are each actively and/or passively discharged.

After completion of the symmetrization phase (FIG. 3c), all energy storage cells $EZ_{m,z}$ of the energy store have approximately the identical state of charge, in particular the identical state of charge.

The discharge of the energy storage cell $EZ_{m,z}$ having a highest state of charge requires a certain time duration. During this time duration, the energy storage cell $EZ_{m,z}$ of the energy storage module $EM_m$ having a lowest state of charge is also passively or actively discharged.

Figure 4:
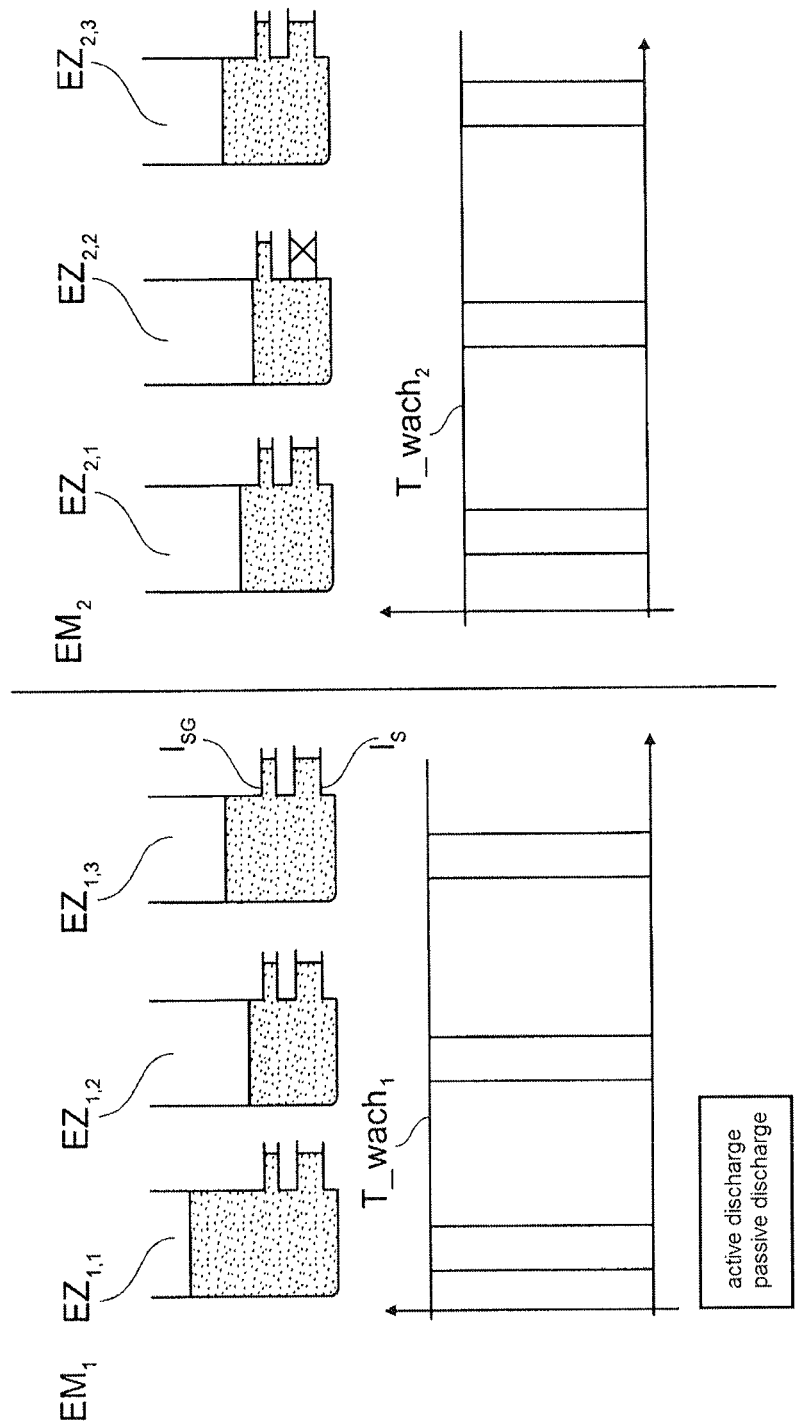
FIG. 4 is a time diagram.

FIG. 4 shows, respectively, a time diagram for a first and a second energy storage module $EM_m$. The monitoring units of the first energy storage module $EM_m$ have a first awake time T_wach,1, and the monitoring units of the second energy storage module $EM_m$ have a second awake time T_wach,2. The first awake time T_wach,1 and the second awake time T_wach,2 are different in size. For example, during the first awake time T_wach,1, the monitoring units of the first energy storage module $EM_1$ are respectively in the active or in the passive operating state for different lengths of time.

Figure 5:
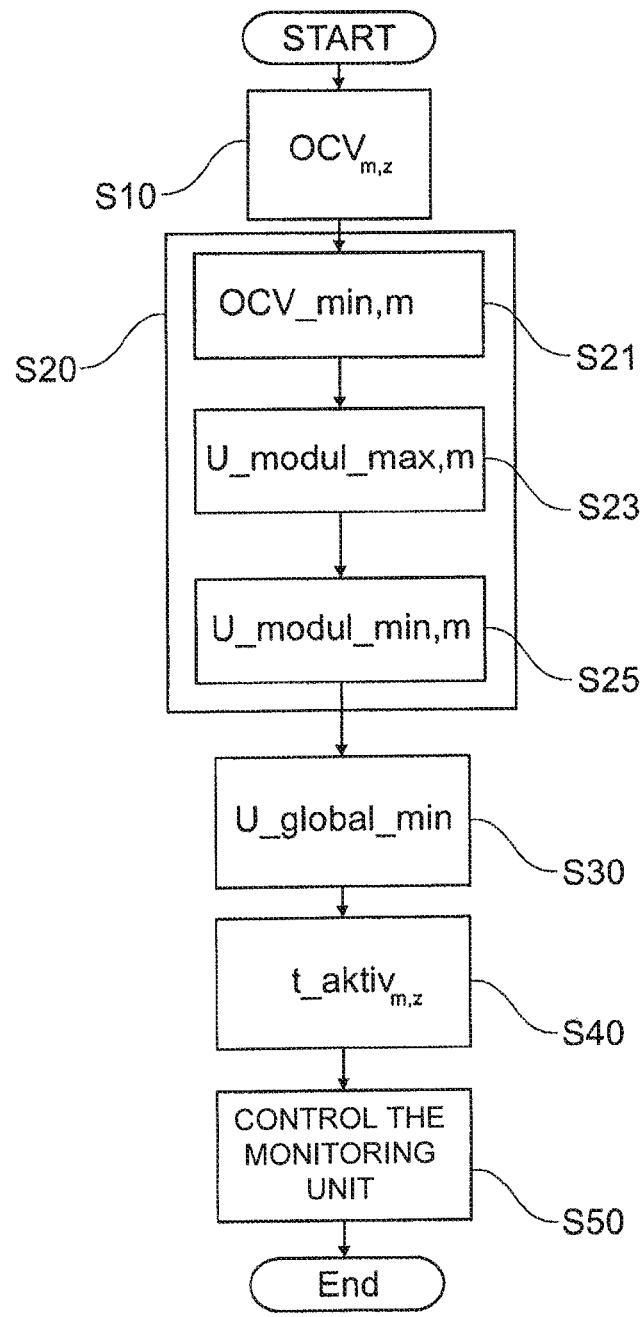
FIG. 5 is a flow chart for a program for operating the energy store.

FIG. 5 shows a flow chart for a program for operating the energy store. After a start of the program, an open-circuit voltage $OCV_{m,z}$ of the respective energy storage cell $EZ_{m,z}$ is detected in a first step S10.

In a step S20, for example a cell discharge voltage U_modul_min,m is determined. For this purpose, for example in a subroutine step 21, a minimum open-circuit voltage OCV_modul_min,m is determined for the respective energy storage module $EM_m$ as a function of the open-circuit voltage $OCV_{m,z}$ of the respective energy storage cell $EZ_{m,z}$ of said energy storage module $EM_m$. For example, the minimum open-circuit voltage OCV_modul_min,m of the energy storage module $EM_m$ can be determined according to Equation 1:

$$OCV\_modul\_min,m = \min(OCV_{1,m}, \ldots, OCV_{z,m}, \ldots, OCV_{Z,m}) \quad \text{(Equation 1)}$$

where z=1 to Z, wherein Z represents for example the total number of energy storage cells $EZ_{m,z}$ of the energy storage module $EM_m$.

Furthermore, in a subroutine step 23, a maximum open-circuit voltage U_modul_max,m is determined for the energy storage module $EM_m$ as a function of the open-circuit voltage $OCV_{m,z}$ of the respective energy storage cell $EZ_{m,z}$ of said energy storage module $EM_m$. For example the maximum open-circuit voltage U_modul_max,m in of the energy storage module $EM_m$ can be determined according to Equation 2:

$$U\_modul\_max,m = \max(OCV_{1,m}, \ldots, OCV_{z,m}, \ldots, OCV_{Z,m}) \quad \text{(Equation 2)}$$

where z=1 to Z, wherein Z represents for example the total number of energy storage cells $EZ_{m,z}$ of the energy storage module $EM_m$.

In a subroutine step 25, the cell discharge voltage U_modul_min,m is determined for the respective energy storage module $EM_m$ as a function of the minimum open-circuit voltage OCV_modul_min,m and of the maximum cell voltage U_modul_max,m of the respective energy storage module $EM_m$, as well as a function of the ratio of the symmetry current $I_S$ to the operating current $I_{SG}$. For example, the cell discharge voltage U_modul_min,m of the energy storage module $EM_m$ can be determined according to Equation 3:

$$U\_modul\_min, m \mathrel{-}= \min\left[-\frac{I_{SG}}{I_S} * \left(U\_modul\_max, m - OCV\_modul\_min, m\right) + OCV\_modul\_min, m\right] \quad \text{(Equation 3)}$$

In a step S30, for example, the target discharge voltage value U_global_min is determined as a function of the determined cell discharge voltage U_modul_min,m of a second number M of energy storage modules $EM_m$. For example, the target discharge voltage value U_global_min of the energy storage module $EM_m$ can be determined according to Equation 4:

$$U\_global\_min = \min(U\_modul\_min,1; \ldots; U\_modul\_min,m; \ldots; U\_modul\_min,M) \quad \text{(Equation 4)}$$

where m=1 to M, wherein M represents for example the total number of energy storage modules $EM_m$ of the energy store.

In a step S40, for example, an active discharge time $t\_aktiv_{m,z}$ is determined for the respective energy storage cell $EZ_{m,z}$ as a function of the specified symmetry current $I_S$, the specified operating current $I_{SG}$, a specified increase C of an open-circuit voltage characteristic OCV_SOC of the energy storage cell $EZ_{m,z}$, the target discharge voltage value U_global_min, and the maximum cell voltage U_modul_max,m of the energy storage module $EM_m$, which includes the energy storage cell $EZ_{m,z}$. For example, the discharge duration $t\_aktiv_{m,z}$ for the respective energy storage cell $EZ_{m,z}$ can be determined according to Equation 5:

$$t\_aktiv_{m,z} = \frac{U\_global\_min - OCV_{m,z}}{C*I_S} + \frac{I_{SG}}{I_S} * \frac{U\_modul\_max, -U\_global\_min}{C*(I_S+I_{SG})} \quad \text{(Equation 5)}$$

In a step S50, for example, the respective monitoring unit for discharging the respective energy storage cell $EZ_{m,z}$ is controlled by use of the specified symmetry current $I_S$ for the discharge duration $t\_aktiv_{m,z}$ associated with the respective energy storage cell $EZ_{m,z}$.

A device for operating the energy store can, for example, have a processing unit such as a central processing unit, with a program and data memory, and can be designed to execute the program for operating the energy store described in FIG. 5. The device for the operation can, for example, be part of a central energy store management system.

Figure 6:
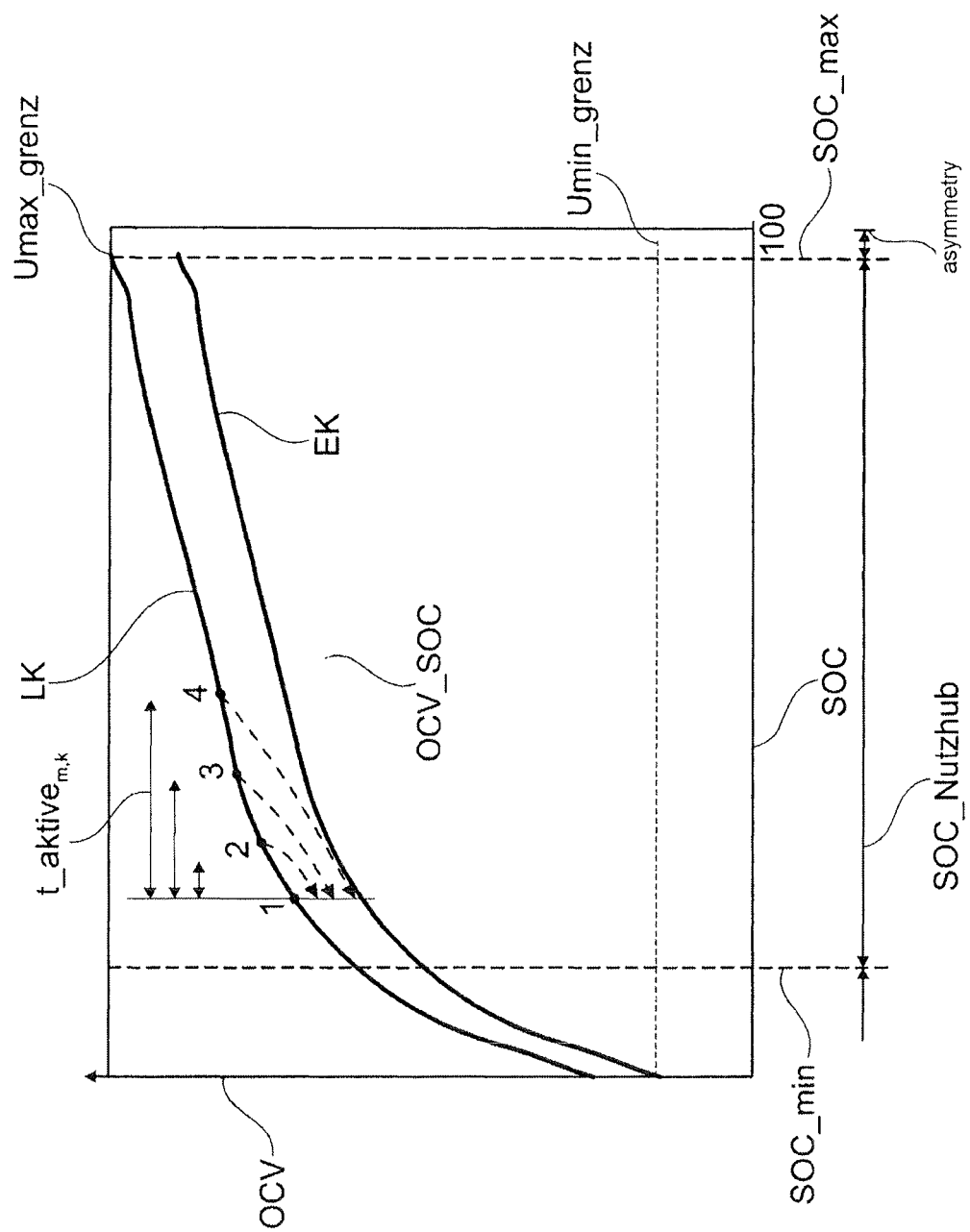
FIG. 6 is a diagram showing progression of the state of charge of a plurality of energy storage cells during the symmetrization phase.
Figure 7:
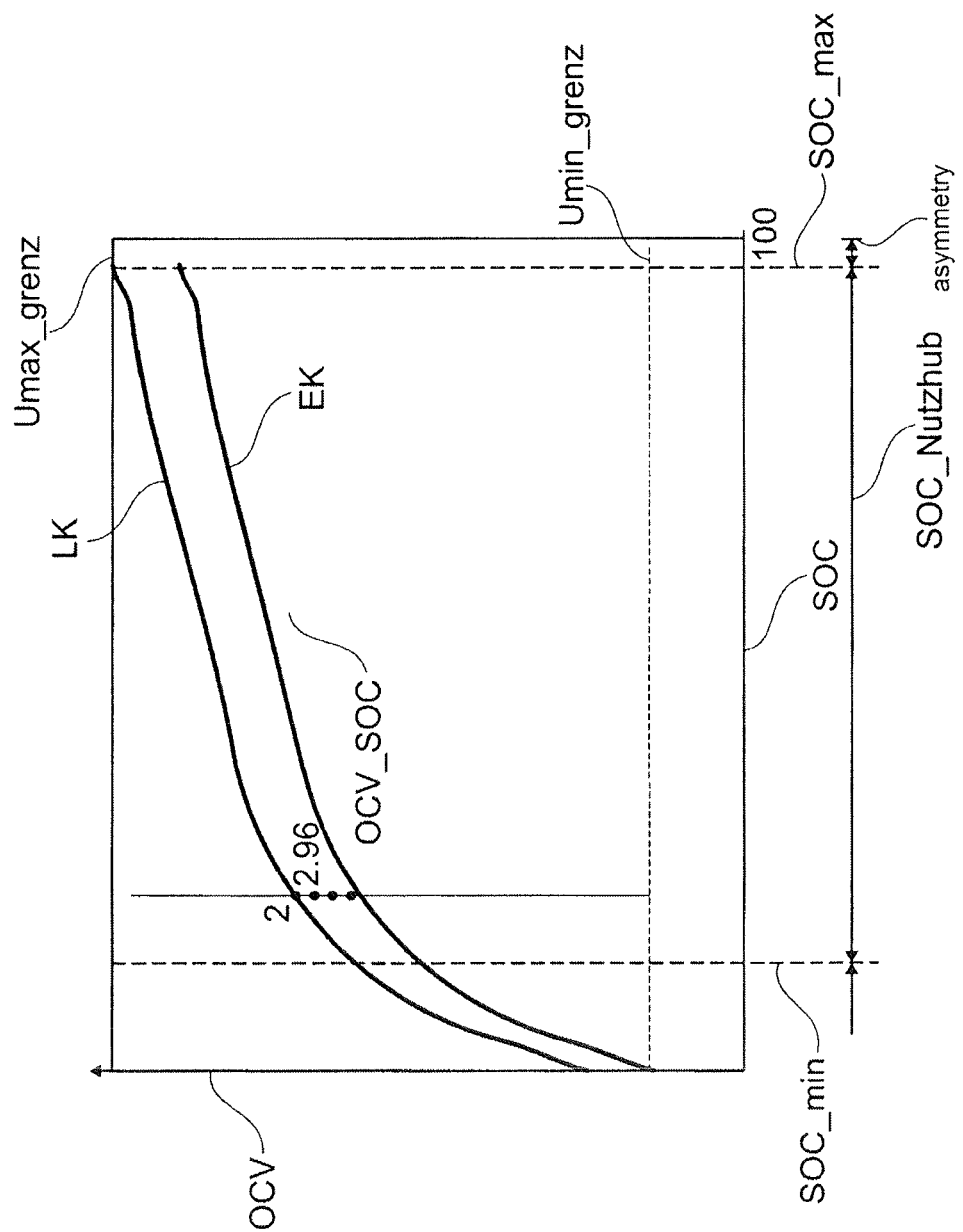
FIG. 7 is a diagram showing the state of charge of a plurality of energy storage cells at the end of the symmetrization phase.
Figure 8:
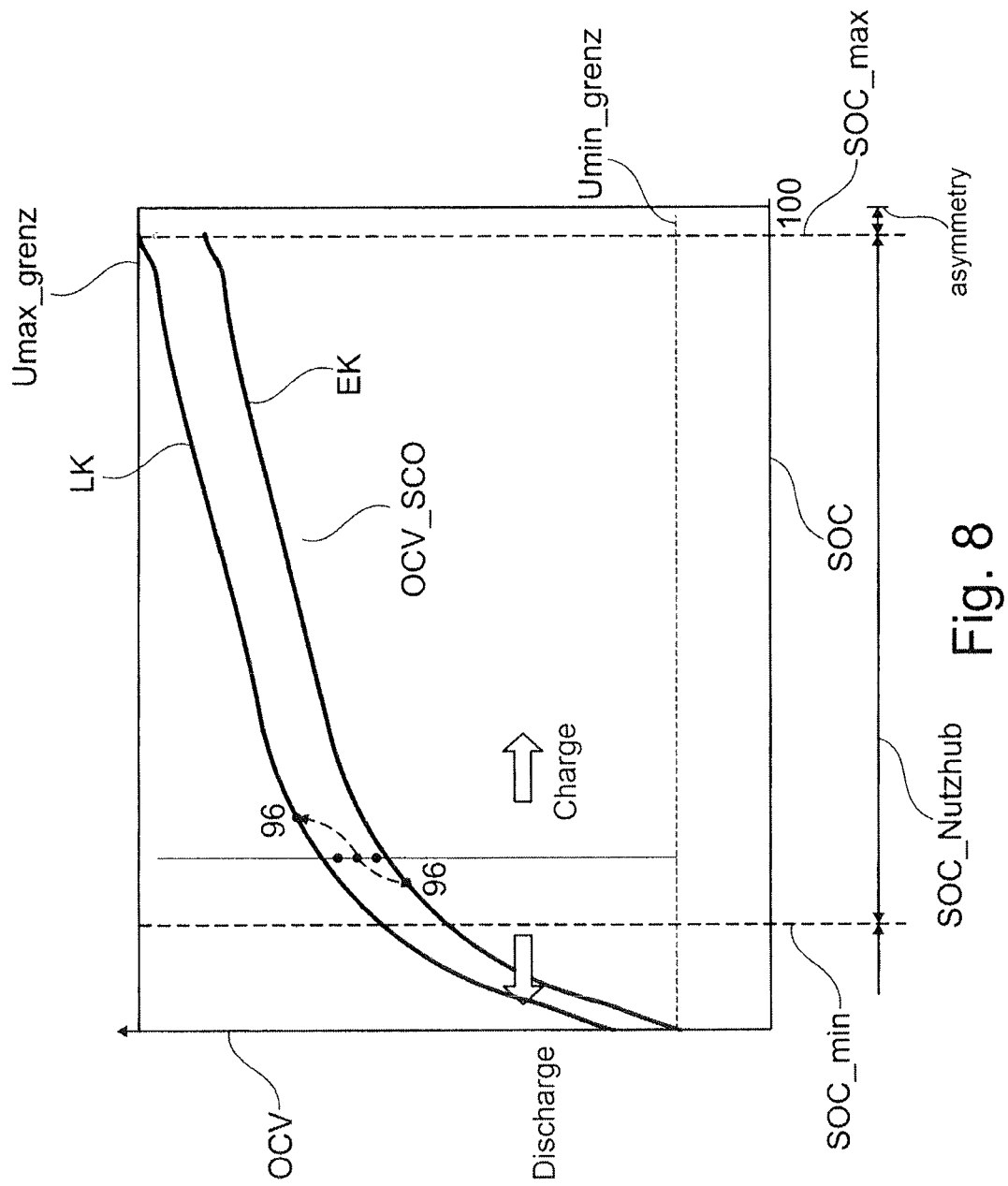
FIG. 8 is a diagram showing an additional progression of the state of charge of a plurality of energy storage cells after the symmetrization phase.

FIGS. 6 to 8 show the progression of the state of charge $SOC_{m,z}$ of a plurality of energy storage cells $EZ_{m,z}$ for example for 96 energy storage cells $EZ_{m,z}$ during the symmetrization phase. The energy storage cells $EZ_{m,z}$ have, respectively, the open-circuit voltage characteristic OCV_SOC shown in FIG. 6. A maximum open-circuit voltage range of an energy storage cell $EZ_{m,z}$ can be limited by a specified lower limit open-circuit voltage Umin_grenz and a specified upper limit open-circuit voltage Umax_grenz. The upper limit open-circuit voltage Umax_grenz can, for example, be specified by a manufacturer.

The open-circuit voltage characteristic OCV_SOC has, for example, a hysteresis with a charge curve LK and a discharge curve EK. The charge curve LK characterizes the open-circuit voltage $OCV_{m,z}$ of the energy storage cells $EZ_{m,z}$ as a function of the respective state of charge $SOC_{m,z}$, which the energy storage cell $EZ_{m,z}$ has after a longer charging phase. The discharge curve EK characterizes the open-circuit voltage $OCV_{m,z}$ of the energy storage cells $EZ_{m,z}$ as a function of the state of charge $SOC_{m,z}$, which the energy storage cell $EZ_{m,z}$ has after a longer discharge phase. For example, the energy storage cells $EZ_{m,z}$ all respectively have an operating point at the beginning of the symmetrization phase, which operating point is characterized by the respective open-circuit voltage $OCV_{m,z}$ and the respective state of charge $SOC_{m,z}$ of the energy storage cell $EZ_{m,z}$, which operating point can be associated with the charge curve LK. The energy storage cells $EZ_{m,z}$ can have different states of charge and thus also different open-circuit voltages.

The energy storage cells $EZ_{m,z}$ are, respectively, discharged for the discharge duration $t\_aktiv_{m,z}$ associated with the respective energy storage cell $EZ_{m,z}$ by means of the specified symmetry current $I_S$. After the discharge of the respective energy storage cells $EZ_{m,z}$, at the end of the symmetrization phase, the energy storage cells $EZ_{m,z}$ each have the identical state of charge (see FIG. 7). The symmetrization can thus take place independently from the hysteresis of the open-circuit voltage characteristic OCV_SOC. The respective open-circuit voltages $OCV_{m,z}$ can, however, be different after the symmetrization. The open-circuit voltage $OCV_{m,z}$ of the respective energy storage cell $EZ_{m,z}$ does not follow the charge curve LK during discharging, but instead an intermediate curve specific to the respective energy storage cell $EZ_{m,z}$, which curve runs in the direction of the discharge curve EK. After completion of the symmetrization phase (see FIG. 8), the open-circuit voltage $OCV_{m,z}$ of the respective energy storage cell $EZ_{m,z}$ follows the respective intermediate curve ZK of the energy storage cell $EZ_{m,z}$ as a function of a specified operating mode of the energy store, for example a specified discharge of the energy store to supply electrical consumers in a vehicle or a specified charging of the energy store.

The following specifies a derivation of the equation for the discharge duration $t\_aktiv_{m,z}$. For a current voltage of the energy storage cell $EZ_{m,z}$, equation (a1) applies:

$$U(t) = -C*(I_{SG}+I_S)*t + OCV_{m,z} \quad \text{(a1)}$$

Where

U: current voltage of the energy storage cell $EZ_{m,z}$ [V]

$OCV_{m,z}$: open-circuit voltage of the energy storage cell $EZ_{m,z}$ [V]

C: increase of the open-circuit voltage characteristic OCV_SOC [V/(A*min)]. The increase of the open-circuit voltage characteristic OCV_SOC is not constant, but instead is a function of the state of charge SOC. To increase the precision of the symmetrization, the increase C can also be determined as a function of the state of charge SOC.

$I_{SG}$=operating current [A] of the monitoring unit $I_S$=symmetry current [A]

It is initially assumed that the energy storage cell $EZ_{m,z}$ having the lowest cell voltage in the energy storage module $EM_m$ is not actively discharged. In order to determine the cell discharge voltage U_modul_min,m within an energy storage module $EM_m$, initially only the discharge is considered by the operating current $I_{SG}$. Equation (a1) becomes:

$$U'_{min}(T'_{wach}) = -C*I_{SG}*T'_{wach} + U_{min} \quad \text{(a2)}$$

Where

Umin=OCV_modul_min,m

T'wach=equalization time to equalize all energy storage cells $EZ_{m,z}$ in the one energy storage module $EM_m$; this equalization time is a mathematical intermediate variable, since the symmetrization must be implemented within all energy storage modules $EM_m$.

U'min=U_modul_min,m; cell discharge voltage within an energy storage module $EM_m$, which represents a minimum cell voltage in the energy storage module $EM_m$ after the passive discharge due to the operating current of the monitoring unit.

The energy storage cell $EZ_{m,z}$, having the largest cell voltage is actively discharged in the energy storage module $EM_m$ for the entire equalization time. In addition to equation (a1), (a3) applies:

$$U\_modul\_min,m(T'_{wach}) = -C*(I_{SG}+I_S)*T'_{wach} + U_{max} \quad \text{(a3)}$$

where $U_{max}$=U_modul_max,m: maximum cell voltage of the energy storage module $EM_m$.

After the equalization time $T'_{wach}$, all energy storage cells $EZ_{m,z}$ in the energy storage module $EM_m$ have mathematically the same voltage. For this reason, the two previous equations correspond to the identical value. The cell discharge voltage U_modul_min,m can be determined by means of equation (a2) and (a3):

$$\text{U\_modul\_min,}\, m = -\frac{I_{SG}}{I_S} * (U_{max} - U_{min}) + U_{min} \quad (a4)$$

In the following, a global minimum, i.e. the target discharge voltage value U_global_min, is determined. For the target discharge voltage value U_global_min, equation (a5) applies:

$$U\_global\_min = \min(U\_modul\_min,1; \ldots; U\_modul\_min,M,) \quad (a5)$$

Furthermore, the awake time T_wach,m can be determined for each monitoring unit:

$$\Delta U_{SG}(T\_wach,m) = -C * I_{SG} * T\_wach,m \quad (a6)$$

Equation (a6) defines a calculated voltage drop for each energy storage cell $EZ_{m,z}$ after the symmetrization due to the operating current $I_{SG}$. A calculated total voltage drop for each energy storage cell $EZ_{m,z}$ is a function of the sum of the voltage drops due to the active discharge and the passive discharge.

$$U(T_{Ende}) - U(T_0) = \Delta U_{SG} + \Delta U_{aktiveEntl.} \quad (a7)$$

The voltage at the end of the symmetrization ($T_{Ende}$) is identical to the target discharge voltage value U_global_min.

$$U\_global\_min - OCV_{m,z} = \Delta U_{SG} + \Delta U_{aktiveEntl.} \quad (a8)$$

$$\Delta U_{aktiveEntl.} = U\_global\_min - OCV_{m,z} - \Delta U_{SG} \quad (a9)$$

For the calculated voltage drop due to the active discharge by the symmetry current $I_S$, equation (a10) applies:

$$\Delta U_{aktiveEntl.} = -C * I_S * t_{aktiveEntl.} \quad (a10)$$

By this means, a first equation for the discharge duration $t\_aktive_{m,z}$ can be specified for each energy storage cell $EZ_{m,z}$:

$$t\_aktive_{m,k} = -\frac{\Delta U_{aktiveEntl.}}{C * I_S} \quad (a11)$$

Furthermore, the awake time T_wach,m can be determined for each monitoring unit. The awake time T_wach,m of the associated monitoring unit can be determined for each energy storage module $EM_m$ as a function of the largest discharge duration $t\_aktiv_{m,z}$ in the energy storage module $EM_m$:

$$T\_wach, m = \max(t\_akvive_{m,1}, t\_akvive_{m,2}, \ldots, t\_akvive_{m,Z}) \quad (a12)$$

i.e., from the energy storage cell $EZ_{m,z}$ having the maximum open-circuit voltage of the energy storage module $EM_m$.

Applying (a6) and (a9) results in:

$$\Delta U_{aktiveEntl.} = U\_global\_min - U\_modul\_max, m + C * I_{SG} * T\_wach, m \quad (a13)$$

Applying (a13), (a10), and (a12) results in:

$$\max(t_{aktiveEntl.}) = T\_wach, m = -\frac{U\_global\_min - U\_modul\_max, m + C * I_{SG} * T\_wach, m}{C * I_S} \quad (a14)$$

$$T\_wach, m = \frac{U\_modul\_max, m - U\_global\_min}{C * (I_S + I_{SG})} \quad (a15)$$

Applying equations (a11), (a13), and (a15), the discharge duration $t\_aktive_{m,z}$ can be determined according to equation (a16):

$$t\_active_{m,z} = -\frac{U\_global\_min - OCV_{m,z} + C * I_{SG} * T\_wach, m}{C * I_S} \quad (a16)$$

LIST OF REFERENCE NUMERALS $EM_m$ Energy storage module
$EZ_{m,z}$ Energy storage cell
$SOC_{m,z}$ State of charge of an energy storage cell
$I_S$ Symmetry current
$I_{SG}$ Operating current
OCV Open-circuit voltage
SOC State of charge
$OCV_{m,z}$ Open-circuit voltage of an energy storage cell
T_wach,m Awake time
$EM_1$ First energy storage module
$EM_2$ Second energy storage module
$EZ_{1\ldots2, 1\ldots3}$ Energy storage cells of the first and the second energy storage module
T_wach,1; First awake time
T_wach,2 Second awake time
OCV_SOC Open-circuit voltage characteristic
LK Charge curve
EK Discharge curve
Umin_grenz Lower limit open-circuit voltage
Umax_grenz Upper limit open-circuit voltage
SOC_min Lower limit state of charge
SOC_max Upper limit state of charge
SOC_Nutzhub Usable state of charge amount
$t\_aktiv_{m,z}$ Discharge duration of an energy storage cell
U_global_min Target discharge voltage value
U_modul_max,m Maximum cell voltage of an energy storage module
OCV_modul_min,m Minimum open-circuit voltage of an energy storage module
U_modul_min,m Cell discharge voltage The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:
1. A method for operating an energy store comprising at least one energy storage module having a plurality of energy storage cells, which are each electrically coupled to a respective different monitoring unit that discharges the coupled energy storage cell by use of a specified symmetry current in an active operating state, the method comprises the acts of:
   detecting an open-circuit voltage of each energy storage cell;
   drawing, by each monitoring unit, a specified operating current from the coupled energy storage cell that enables the respective monitoring unit to discharge the coupled energy storage cell by use of the specified symmetry current;

determining a discharge duration for each energy storage cell as a function of the detected open-circuit voltage of the energy storage cell, a specified target discharge voltage value, and the specified operating current, such that:

$$t\_aktiv_{m,z} = \frac{U\_global\_min - OCV_{m,z}}{C \cdot I_S} + \frac{I_{SG}}{I_S} \cdot \frac{U\_modul\_max - U\_global\_min}{C \cdot I_S + I_{SG}}$$

where $t\_aktiv_{m,z}$ is the discharge duration, U_global_min is the target discharge voltage value, U_modul_max is the maximum cell voltage for the energy storage module, $OCV_{m,z}$ is the open-circuit voltage of the energy storage cell, C is a specified increase of an open-circuit voltage characteristic curve, $I_{SG}$ is operating current, and $I_S$ is the symmetry current; and controlling each monitoring unit in order to discharge the respective energy storage cell coupled to each such monitoring unit by use of the specified symmetry current for the discharge duration associated with the respective energy storage cell, wherein the specified symmetry current used by each monitoring unit to discharge each respectively coupled energy storage cell is equal for each monitoring unit.

2. The method according to claim 1, wherein the maximum cell voltage for the energy storage module is respectively determined as a function of the open-circuit voltages of each energy storage cell of the energy storage module.

3. The method according to claim 1, wherein the specified increase is determined as a function of a state of charge detected for the energy storage cell.

4. The method according to claim 1, wherein the target discharge voltage value is determined as a function of the open-circuit voltages detected for a specified first number of energy storage cells.

5. The method according to claim 1, further comprising the acts of:

respectively determining a minimum open-circuit voltage for each energy storage module as a function of the open-circuit voltages of the respective energy storage cells of said energy storage module;

determining a cell discharge voltage for the respective energy storage module as a function of the minimum open-circuit voltage of the respective energy storage module; and determining the target discharge voltage value as a function of the cell discharge voltages determined for a second number of energy storage modules.

6. The method according to claim 5, wherein the cell discharge voltage for each energy storage module is determined as a function of the maximum cell voltage of the energy storage module.

7. The method according to claim 5, wherein the cell discharge voltage for each energy storage module is determined as a function of a ratio of the symmetry current to the operating current of the monitoring unit.

8. The method according to claim 6, wherein the cell discharge voltage for each energy storage module is determined as a function of a ratio of the symmetry current to the operating current of the monitoring unit.

9. The method according to claim 1, wherein the respective monitoring unit has an active operating state and a passive operating state, wherein in the active operating state the monitoring unit discharges the energy storage cell by way of the specified symmetry current and the operating current drawn from the energy storage cell, and wherein in the passive operating state the monitoring unit discharges the energy storage cell by way of the operating current and draws the specified operating current from the energy storage cell but does not discharge the energy storage cell by way of the specified symmetry current.

10. An energy store, comprising:

at least one energy storage module having a plurality of energy storage cells;

at least one monitoring unit, each of the plurality of energy storage cells being electrically coupled to a respective different monitoring unit, wherein each respective monitoring unit is operatively configured to discharge the respective electrically coupled energy storage cell via a specified symmetry current in an active operating state of the respective monitoring unit, and wherein each monitoring unit draws a specified operating current from the coupled energy storage cell to enable the respective monitoring unit to discharge the coupled energy storage cell by use of the specified symmetry current;

a control unit operatively configured to operate the energy store, the control unit comprising a memory having program code stored therein that:

detects an open-circuit voltage of each energy storage cell;

determines a discharge duration of each energy storage cell as a function of the detected open-circuit voltage of the energy storage cell, a specified target discharge value, and the specified operating current, such that:

$$t\_aktiv_{m,z} = \frac{U\_global\_min - OCV_{m,z}}{C \cdot I_S} + \frac{I_{SG}}{I_S} \cdot \frac{U\_modul\_max - U\_global\_min}{C \cdot I_S + I_{SG}}$$

where $t\_aktiv_{m,z}$ is the discharge duration, U_global_min is the target discharge voltage value, U_modul_max is the maximum cell voltage for the energy storage module, $OCV_{m,z}$ is the open-circuit voltage of the energy storage cell, C is a specified increase of an open-circuit voltage characteristic curve, $I_{SG}$ is operating current, and $I_S$ is the symmetry current; and controls each monitoring unit in order to discharge the respective energy storage cell coupled to each such monitoring unit by use of the specified symmetry current for the discharge duration associated with the respective energy storage cell, wherein the specified symmetry current used by each monitoring unit to discharge each respectively coupled energy storage cell is equal for each monitoring unit.

11. The energy store according to claim 10, wherein the memory of the control unit further has program code stored therein that operates the respective monitoring unit in an active operating state and in a passive operating state, wherein in the active operating state the monitoring unit discharges the energy storage cell by way of the specified symmetry current and the operating current drawn from the energy storage cell, and wherein in the passive operating state the monitoring unit discharges the energy storage cell by way of the operating current and draws the specified operating current from the energy storage cell but does not discharge the energy storage cell by way of the specified symmetry current.

* * * * *